United States Patent [19]

Tuan et al.

[11] Patent Number: 4,986,688
[45] Date of Patent: Jan. 22, 1991

[54] STRUCTURE OF BALL AND SOCKET JOINT FOR A VEHICLE STEERING CONTROL SYSTEM

[76] Inventors: C. T. Tuan; Yuan-Ling Tuan, both of 4F, 64, Lane 283, Chung Cheng Rd., Yung Ho, Taipei Hsien, Taiwan

[21] Appl. No.: 509,509

[22] Filed: Apr. 16, 1990

[51] Int. Cl.⁵ .............................................. F16C 11/06
[52] U.S. Cl. ..................... 403/127; 403/37; 403/128; 403/132; 403/143; 403/144
[58] Field of Search .......... 403/122, 127–128, 403/132–134, 136, 138, 144, 146, 124–126, 143, 76–77, 37, 39; 29/149.5 B

[56] References Cited

U.S. PATENT DOCUMENTS

| | | | |
|---|---|---|---|
| 1,637,765 | 8/1927 | Comstock | 403/131 X |
| 1,788,083 | 1/1931 | Church | 403/124 X |
| 2,544,584 | 3/1951 | Booth | 403/127 |
| 2,676,045 | 4/1954 | Moskovitz | 403/125 |
| 2,707,645 | 5/1955 | Moskovitz | 403/124 X |
| 2,841,428 | 7/1958 | Moskovitz | 403/136 X |
| 2,885,248 | 5/1959 | White | 403/125 X |
| 3,072,426 | 1/1963 | Gilbert | 403/128 X |
| 3,130,992 | 4/1964 | Peras | 403/126 |
| 4,431,328 | 2/1984 | Smith | 403/138 X |
| 4,679,957 | 7/1987 | Bauer | 403/131 X |

FOREIGN PATENT DOCUMENTS

| | | | |
|---|---|---|---|
| 146964 | 2/1950 | Australia | 403/125 |
| 516858 | 1/1940 | United Kingdom | 403/125 |
| 2066893 | 7/1981 | United Kingdom | 403/124 |

*Primary Examiner*—Andrew V. Kundrat
*Assistant Examiner*—Franco S. Deliguori
*Attorney, Agent, or Firm*—Wenderoth, Lind & Ponack

[57] ABSTRACT

A ball and socket joint for a vehicle steering control system, which includes an inner ball head received in a ball socket which simultaneously serves as an outer ball head and is received in a casing which has a shank connected to a drag link of a vehicle steering control system. The ball socket has a unitary connecting rod connected to a wheel steering knuckle arm. A holder plate and a spring are respectively set in the casing to support the inner and outer ball heads for free positioning of the inner ball head in the outer ball head so that steering control operation can be more smoothly performed.

2 Claims, 1 Drawing Sheet

STRUCTURE OF BALL AND SOCKET JOINT FOR A VEHICLE STEERING CONTROL SYSTEM

BACKGROUND OF THE INVENTION (a) Field of the Invention

The present invention is related to ball and socket joints and more particularly to a ball and socket joint for a vehicle steering control system which includes an outer ball head in the form of a semi-spherical shell received in a casing and stopped at a top reducing hole of such a casing, which outer ball head simultaneously serves as a socket for receiving therein of an inner ball head of an end ball and is supported by a spring coil and a holder plate to stabilize the free positioning of the inner ball head in the outer ball head.

(b) Description of the Prior Art

In vehicle steering control system, the connection between a steering drag link and a steering knuckle arm is generally made through a ball and socket joint. Therefore, the performance of a ball and socket joint effects the smooth steering control of a vehicle. In a regular vehicle steering control system, a ball and socket joint generally includes a ball head received in a socket-like casing, stopped at the top reducing hole of such a casing and supported by a spring and a seat. One disadvantage of this type of ball and socket joint is the quick wearing problem of the ball head and the inner wall surface of the casing which expands the gap between the ball head and the casing. In consequence, the steering control becomes unstable. Further, when a vehicle front wheel is crushed, the impact force may be transferred through a steering knuckle arm to force the ball head to break away from the constraint of the casing and to completely disable the operation of steering control. In general, the problem of the conventional structure of a ball and socket joint is that the parts tend to wear off and break away easily. It is therefore, the purpose of the present invention to eliminate this problem.

SUMMARY OF THE INVENTION

One object of the present invention is to provide a ball and socket joint with improved positioning structure to protect the ball head from breaking away.

Another object of the present invention is to provide a ball and socket joint which utilizes a holder plate and a spring coil to support a ball head permitting such a ball head to rotate smoothly and in a stable manner.

Still another object of the present invention is to provide a ball and socket joint which includes a ball head incorporated with an auxiliary ball head permitting such a ball head to automatically adjust its position to compensate for the gap within its contact area so as to ensure a smooth rotation.

BRIEF DESCRIPTION OF THE DRAWINGS

The present invention will now be described by way of example with reference to the annexed drawings, in which.

DETAILED DESCRIPTION OF THE PREFERRED EMBODIMENTS

Figure 1:
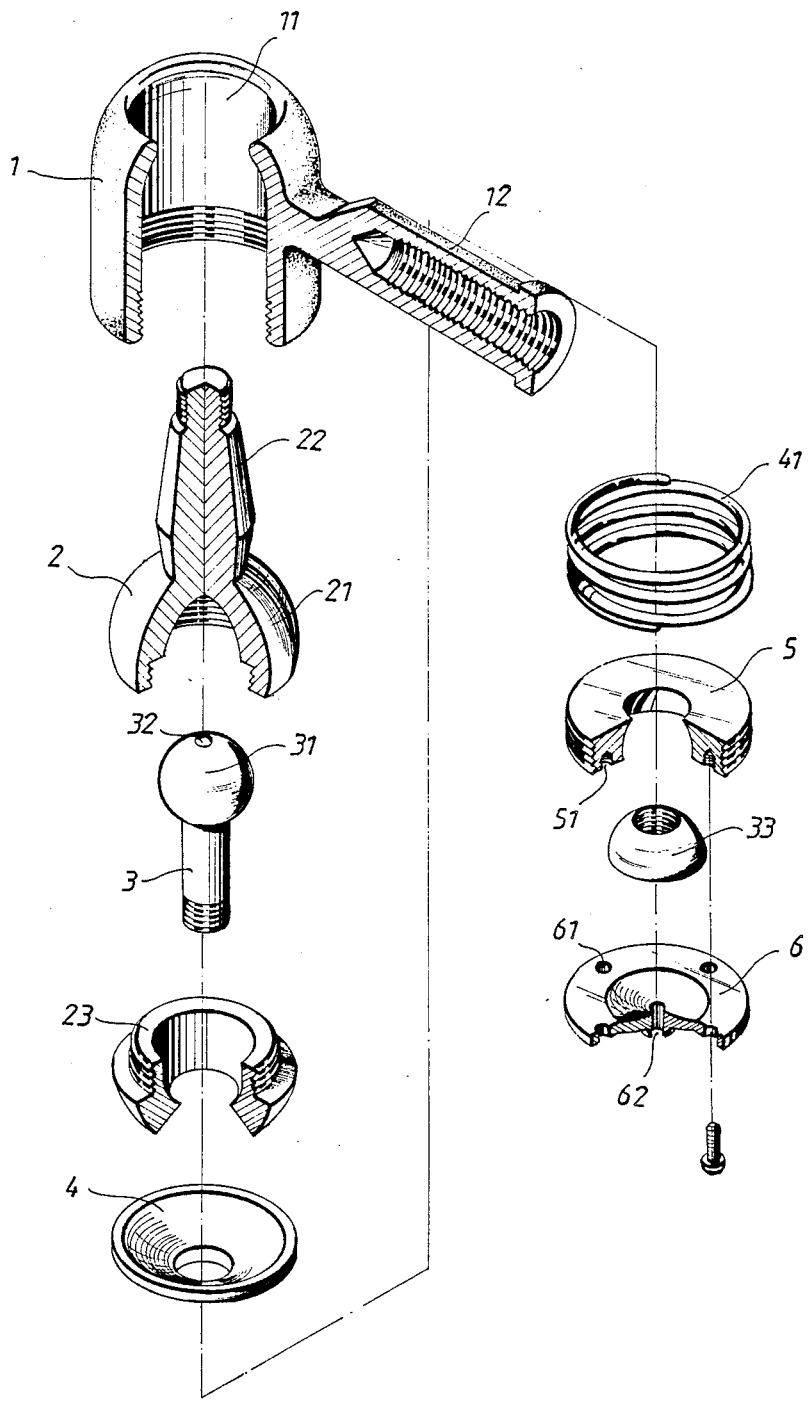
FIG. 1 is a perspective exploded view of the present invention.

Referring to FIG. 1, a ball and socket joint of the present invention is generally comprised of a casing 1, a ball socket 2, an end ball 3, a holder plate 4, a seat 5 and a cap 6.

The casing 1 has a hollow, cylindrical body defining a reducing hole 11 on the top for holding the intermediate ball socket 2 therein and comprising an inner thread at a lower end for the fastening therein of the seat 5 through a screw joint and a unitary, bolted shank 12 at one side for connection with the drag link of a vehicle steering control system.

The ball socket 2 includes an outer ball head in the form of a semi-spherical shell 21 having an inner thread for connection with a circular head plate 23 through screw joint. After the circular head plate 23 and the semi-spherical shell 21 are screwed together, they form a spherical member which is further received in the casing 1 with the circular head plate resiliently supported by the holder plate 4 so as to define a circular receiving chamber for the setting therein of the ball head (inner ball head) 31 of the end ball 3 to confine its range of movement. The ball socket 2 has a unitary connecting rod 22 extending upward from the top which has a screw end for securing a universal knuckle arm to the front wheel.

The end ball 3 includes a rod portion extending downward from its ball head 31 and a bottom screw, end for fastening an auxiliary ball head 33 in the form of a semi-sphere. A grease filling hole 32 is provided on the end ball 3 vertically from the top to, the bottom so that grease can be injected to lubricate the contact area between the ball socket 2 and the end ball 3.

The holder plate 4 is a substantially bowl-like disc having a round hole in the center for the insertion therethrough of the bottom rod portion of the end ball 3. After the holder plate 4 is set in the casing 1, a spring coil 41 is set between the holder plate 4 and the seat 5 to constantly push the holder plate 4 upward permitting the holder plate 4 to firmly engage with the circular head plate 23 of the ball socket 2.

The seat 5 has a spherical recess on its bottom for the flexible positioning of the auxiliary ball head 33 so that the end ball 3 can be automatically adjusted to compensate for the clearance between its contact area. The seat 5 has an outer thread on its circular side wall portion for connection with the inner thread of the casing 1, and a plurality of bolt holes 51 on its bottom surface for the connection thereto of the cap 6 by means of screw bolts.

The cap 6 is a circular cover having a plurality of binding holes 61 corresponding to the bolt holes 51 of the seat 5 so that screw bolts can be inserted therein to secure the cap 6 to the bottom surface of the seat 5 and simultaneously seal the bottom hole of the casing 1. A grease filling hole 62 is provided on the cap 6 through its central axis in communication with filling hole 32, so that grease can be injected to lubricate all contacting parts.

Figure 2:
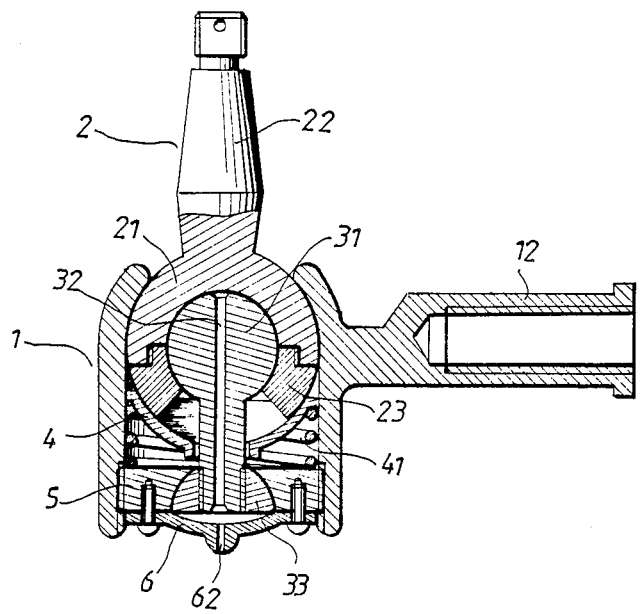
FIG. 2 is a side sectional view thereof.

Referring to FIG. 2, after the spherical shell 21 of the ball socket 2 is screwed up with the circular head plate 23, a hollow ball head is formed at the bottom of the ball socket 2 for receiving the ball head 31 of the end ball 3. After the ball socket 2 is received in the casing 1, the spherical shell 21 is stopped at the reducing hole 11 of the casing 1 and its circular head plate 23 is firmly supported by the holder plate 4, and the hollow ball head which is formed of the ball socket 2 is smoothly confined within the casing 1. Because the ball head 31 of the end ball 3 is retained inside the hollow ball head of the ball socket 2 and the hollow ball head of the ball socket 2 is firmly retained between the reducing hole 11 of the casing 1 and the holder plate 4, the double ball-head structure of the present invention is firmly retained within the casing 1 to resist high impact force and damage. After the auxiliary ball head 33 is coupled with the end ball 3 the semi-sphere shape the auxiliary ball head 33 permits it to rotate within the bottom spherical recess of the seat 5 so that the end ball 3 can automatically adjust to a stable position during the rotation of the ball socket 2 for stable steering control.

Because the end ball 3 has a grease filling hole 32 for injecting grease therethrough to lubricate the contact area between its ball head 31 and the spherical shell 21 of the ball socket 2 and because the sliding contact area of the ball head 31 is relatively greater than in a conventional structure, stable rotation of the ball head and high performance in wear-resistance can be achieved. In addition, the end ball 3 can automatically adjust its position to compensate for any gap within its sliding contact area, and the holder plate 4 and the spring coil 41 can firmly support the end ball 3 for smooth contact with the spherical shell 21 of the ball socket 2. Therefore, the present invention can provide extended durability and constant smooth performance.

Figure 3:
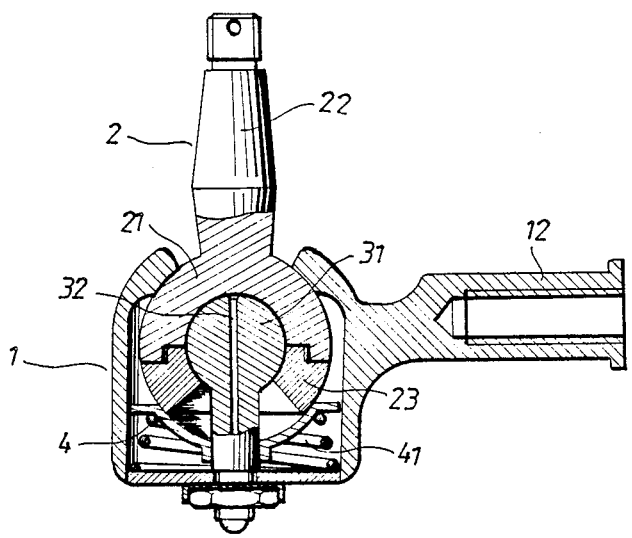
FIG. 3 is a side sectional view of an alternate form of the present invention.

FIG. 3 illustrates an alternate form of the present invention, in which the auxiliary ball head 33 of the aforesaid embodiment is eliminated to simplify the structure of the ball and socket joint without affecting its performance.

As indicated, the present invention may be variously embodied. Recognizing that various modifications are apparent, the scope herein shall be deemed as defined in the claims set forth hereinafter.

We claim:

1. A ball and socket joint, including:
   a casing having a hollow, cylindrical body defining a reduced size hole at a top end, an inner thread at a lower end and a threaded shank at one side of said housing for connection to a drag link of a vehicle steering control system;
   a ball socket including a semi-spherical shell having an inner thread connected to a circular head plate through a threaded joint to form a spherical member for setting in said casing with its upper spherical portion stopped at said reduced size hole, and a unitary connecting rod extending upward from the top of said shell, said connecting rod having a threaded end for securing a universal knuckle arm to the front wheel;
   an end ball comprising a rod portion extending downward from a ball head, said ball head being received in said, spherical member, said rod portion having a bottom threaded end connected to an auxiliary semi-spherical ball head;
   a holder plate in the form of a substantially bowl-like disc received in said casing and having a round hole in the center for the insertion therethrough of said rod portion of said end ball;
   a circular seat having a spherical recess on its bottom for holding said auxiliary ball head permitting said end ball to automatically adjust its positioning, and comprising an outer thread on its circular side wall portion for threaded engagement with said inner thread of said casing and a plurality of bolt holes on its bottom surface;
   a spring coil received in said casing and set between said holder plate and said seat constantly biasing said holder plate upward into engagement with the circular head plate of said ball socket; and
   a cap in the form of a circular cover having a plurality of holes corresponding to the bolt holes of said seat for the fastening therein of screw bolts to secure said cap to the bottom surface of said seat to simultaneously seal the bottom end of said casing.

2. A ball and socket joint as claimed in claim 1, wherein a grease filling hole is made on said end ball vertically extending therethrough from the top to the bottom of said end ball for the filling therein of grease to lubricate the contact area between said ball socket and said end ball.

* * * * *